United States Patent
Uemura et al.

(10) Patent No.: US 9,531,301 B2
(45) Date of Patent: Dec. 27, 2016

(54) POWER CONVERSION DEVICE AND MOTOR DRIVING DEVICE

(71) Applicant: Mitsubishi Electric Corporation, Tokyo (JP)

(72) Inventors: Keisuke Uemura, Tokyo (JP); Takuya Shimomugi, Tokyo (JP); Koichi Arisawa, Tokyo (JP); Yosuke Shinomoto, Tokyo (JP); Shigeo Umehara, Tokyo (JP); Shinichiro Ura, Tokyo (JP); Makoto Tanikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/779,991

(22) PCT Filed: Apr. 12, 2013

(86) PCT No.: PCT/JP2013/061095
§ 371 (c)(1),
(2) Date: Sep. 25, 2015

(87) PCT Pub. No.: WO2014/167719
PCT Pub. Date: Oct. 16, 2014

(65) Prior Publication Data
US 2016/0036350 A1 Feb. 4, 2016

(51) Int. Cl.
*H02P 7/00* (2016.01)
*H02M 7/5387* (2007.01)
(Continued)

(52) U.S. Cl.
CPC ..... *H02M 7/53871* (2013.01); *H02M 7/53875* (2013.01); *H02P 27/06* (2013.01);
(Continued)

(58) Field of Classification Search
CPC ............... H02M 7/53781; H02M 7/53875; H02M 2001/0009; H02M 2007/53876; H02P 27/06
(Continued)

(56) References Cited

U.S. PATENT DOCUMENTS 5,345,156 A * 9/1994 Moreira ................ D06F 37/304
318/400.04
5,675,231 A * 10/1997 Becerra ..................... H02P 7/04
318/400.17
(Continued)

FOREIGN PATENT DOCUMENTS

JP 09-093948 A 4/1997
JP 2003-209976 A 7/2003
(Continued)

OTHER PUBLICATIONS

International Search Report of the International Searching Authority mailed Jul. 16, 2013 for the corresponding international application No. PCT/JP2013/061095 (and English translation).

*Primary Examiner* — Rita Leykin
(74) *Attorney, Agent, or Firm* — Posz Law Group, PLC

(57) ABSTRACT

The power conversion device includes a power-supply shunt resistor provided between a negative voltage side of a DC power supply and an inverter and phase lower-arm shunt resistors respectively provided between phase lower-arm switching elements of two arms among three arms and the power-supply shunt resistor. The power conversion device detects voltages between connection points of the phase lower-arm switching elements and the phase lower-arm shunt resistors and a negative voltage side of the DC power supply and calculates, on the basis of detection values of the voltages, phase currents flowing to a load device.

17 Claims, 19 Drawing Sheets

(51) Int. Cl.
*H02P 27/06* (2006.01)
*H02M 1/00* (2006.01)

(52) U.S. Cl.
CPC *H02M 7/53873* (2013.01); *H02M 2001/0009* (2013.01); *H02M 2007/53876* (2013.01)

(58) Field of Classification Search
USPC ............ 318/400.2, 432, 434, 722, 438, 801, 807,318/781, 805, 810; 363/98, 39; 62/228.1
See application file for complete search history.

(56) References Cited

U.S. PATENT DOCUMENTS

| | | | | |
|---|---|---|---|---|
| 5,986,419 A * | 11/1999 | Archer | ................... | H02K 29/12 318/400.02 |
| 6,538,404 B2 * | 3/2003 | Kato | ................ | H02M 7/53871 318/139 |
| 6,765,372 B2 * | 7/2004 | Isham | ................... | G01R 31/40 323/224 |
| 7,365,951 B2 * | 4/2008 | Sun | ................... | H05B 41/2983 315/291 |
| 7,469,940 B2 * | 12/2008 | Sun | ................... | H05B 41/2983 315/224 |
| 7,721,564 B2 * | 5/2010 | Rizzo | ................. | B60H 1/00428 363/39 |
| 7,986,121 B2 * | 7/2011 | Hayashi | ................. | H02P 21/18 318/434 |
| 8,742,704 B2 * | 6/2014 | Nakatsugawa | ....... | H02P 21/141 318/400.02 |
| 8,847,534 B2 * | 9/2014 | Li | ....................... | H02M 1/4216 318/438 |
| 8,897,043 B2 * | 11/2014 | Usami | ................... | H02M 7/219 363/125 |
| 8,970,158 B1 * | 3/2015 | Chowning | .............. | H02P 27/16 318/127 |

FOREIGN PATENT DOCUMENTS

| | | | | |
|---|---|---|---|---|
| JP | 2006-067747 A | | 3/2006 | |
| JP | 2006-101685 A | | 4/2006 | |
| JP | 2006101685 | * | 4/2006 | ............. H02M 7/48 |
| JP | 2006-254671 A | | 9/2006 | |
| JP | 2006067747 | * | 9/2006 | ............. H02M 7/48 |
| JP | 2006254671 | * | 9/2006 | ............. H02M 7/48 |
| JP | 2007236188 | * | 1/2007 | ............. H02M 7/48 |
| JP | 2007-236188 A | | 9/2007 | |
| JP | 2011-004539 A | | 1/2011 | |
| JP | 2011-050183 A | | 3/2011 | |
| JP | 2011050183 | * | 3/2011 | ............. H02P 21/00 |

* cited by examiner (a)

(b)

|    | 3a | 3b | 3c |
|----|----|----|----|
| V0 | 0  | 0  | 0  |
| V1 | 1  | 0  | 0  |
| V2 | 0  | 1  | 0  |
| V3 | 0  | 0  | 1  |
| V4 | 1  | 1  | 0  |
| V5 | 0  | 1  | 1  |
| V6 | 1  | 0  | 1  |
| V7 | 1  | 1  | 1  |

POWER CONVERSION DEVICE AND MOTOR DRIVING DEVICE

CROSS REFERENCE TO RELATED APPLICATION

This application is a U.S. national stage application of International Patent Application No. PCT/JP2013/061095 filed on Apr. 12, 2013, the disclosure of which is incorporated herein by reference.

TECHNICAL FIELD

The present invention relates to a power conversion device, a motor driving device including the power conversion device, a blower and a compressor including the motor driving device, and an air conditioner, a refrigerator, and a freezer including the blower and the compressor.

BACKGROUND

In a power conversion device that generates a three-phase AC voltage and supplies the three-phase AC voltage to a load by combining ON/OFF states of switching elements configuring a three-phase inverter of a PWM modulation system, the power conversion device detects phase currents flowing to a three-phase load such as a motor and controls the load on the basis of the phase currents.

As means for detecting the phase currents flowing to the three-phase load, there are configurations in which a current sensor and a shunt resistor connected in series to the switching elements configuring the inverter are provided. As the configuration in which the shunt resistor is provided, there are a configuration in which a power-supply shunt resistor that detects an electric current between a DC power supply and an inverter device is provided and a configuration in which a lower-arm shunt resistor that detects a phase current of a relevant phase is provided between a lower-arm switching element and a minus side of the DC power supply. In the configurations in which the power-supply shunt resistor and the lower-arm shunt resistor are provided, it is necessary to specify a phase current detected for each of phases. Control software is complicated. In the configuration in which the power-supply shunt resistor is provided, when only an electric current for one phase can be detected, it is necessary to perform energization control to detect electric currents for two phases. That is, a period in which the phase currents are detected in one switching cycle is limited to a narrow range. Therefore, an inverter device is disclosed that can detect, for example, by "providing a power-supply shunt resistor and lower-arm shunt resistors for at least two phases and detecting, with the power-supply shunt resistor, a phase current that cannot be detected by the lower-arm shunt resistors", the phase current with simple control software not requiring specifying of a detection current for each phase, energization adjustment, and time-series current detection (e.g., Patent Literature 1).

PATENT LITERATURE

Patent Literature 1: Japanese Patent Application Laid-Open No. 2006-67747

In the configuration in which the shunt resistor is provided, it is necessary to set a resistance value of the shunt resistor to a sufficiently small resistance value not to affect the operation of the inverter and not to consume excess electric power. To detect an electric current flowing to the shunt resistor, it is necessary to amplifier a voltage across both ends of the shunt resistor and take the voltage into control means. Therefore, it is necessary to provide amplifying means at the pre-stage of the control means.

In the technology described in Patent Literature 1, it is necessary to take a voltage across both ends of the lower-arm shunt resistor and a voltage across both ends of the power-supply shunt resistor into the control means. Therefore, in a configuration in which lower-arm shunt resistors for two phases and power-supply shunt resistor are provided, at least three amplifying means are necessary. In a configuration in which lower-arm shunt resistors for three phases and power-supply shunt resistor are provided, at least four amplifying means are necessary.

When resistance values are different in the lower-arm shunt resistor and the power-supply shunt resistor, gains are different in amplifying means for amplifying the voltage across both ends of the lower-arm shunt resistor and amplifying means for amplifying the voltage across both ends of the power-supply shunt resistor. Therefore, fluctuation in a detection value due to hardware increases.

Further, the phase current that cannot be detected by the lower-arm shunt resistor is detected by the power-supply shunt resistor. Therefore, a control procedure is complicated.

Therefore, in the technology described in Patent Literature 1, there is a problem in that an increase in the size and an increase in the costs of the device are caused according to the increase of the amplifying means, suppression of the fluctuation in the detection value, the complication of the control procedure, and the like.

SUMMARY

The present invention has been devised in view of the above and it is an object of the present invention to provide a power conversion device that can extend a detection period of phase currents and attain improvement of accuracy of control based on the phase currents without causing an increase in the size and an increase in the costs of the device.

In order to solve the problems and achieve the object, according to an aspect of the present invention, there is provided a power conversion device that converts DC power supplied from a DC power supply into three-phase AC power to be supplied to a load device, the power conversion device including: an inverter that is configured by connecting arms for three phases in parallel, each of the arms including an upper-arm switching element and a lower-arm switching element; a power-supply shunt resistor provided between a negative voltage side of the DC power supply and the inverter; phase lower-arm shunt resistors respectively provided between the phase lower-arm switching elements for at least two phases among the three phases and the power-supply shunt resistor; phase lower-arm voltage detection units to detect voltages between connection points of the phase lower-arm switching elements and the phase lower-arm shunt resistors and the negative voltage side of the DC power supply; and a control unit to calculate, on the basis of detection values of the phase lower-arm voltage detection units, phase currents flowing to the load device and generate, on the basis of the phase currents, six drive signals corresponding to the phase upper-arm switching elements and the phase lower-arm switching elements.

According to the present invention, there is an effect that it is possible to extend a detection period of phase currents and attain improvement of accuracy of control based on the

DETAILED DESCRIPTION

Exemplary embodiments of the present invention are explained below with reference to the accompanying drawings. Note that the present invention is not limited by the embodiments explained below.

First Embodiment

Figure 1:
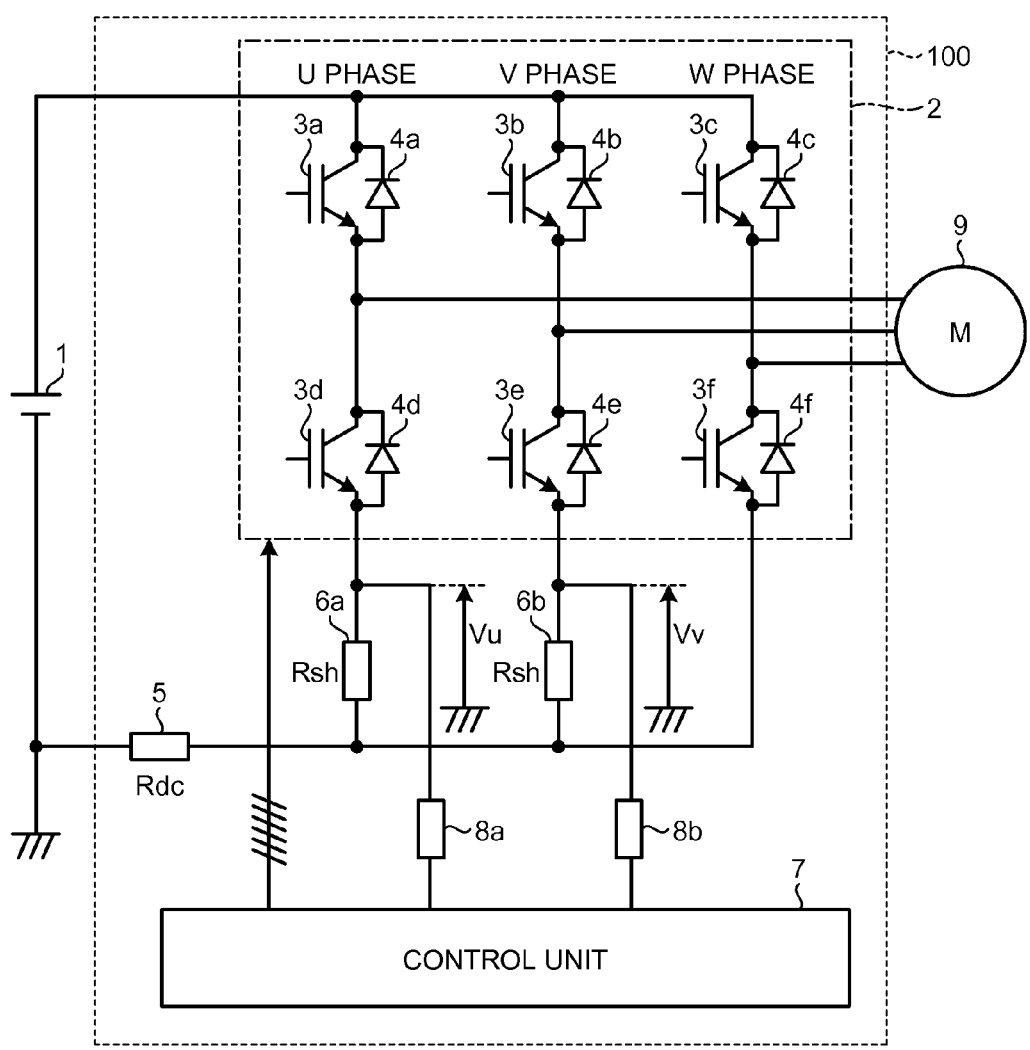
FIG. 1 is a diagram showing a configuration example of a power conversion device according to a first embodiment.

FIG. 1 is a diagram showing a configuration example of a power conversion device according to a first embodiment. In the example shown in FIG. 1, a power conversion device 100 according to the first embodiment is configured to convert DC power supplied from a DC power supply 1 into three-phase AC power supplied to a load device (in the example shown in FIG. 1, a motor) 9.

As shown in FIG. 1, the power conversion device 100 includes, as main components for supplying three-phase AC power to the motor 9, an inverter 2 configured by three arms including upper-arm switching elements 3a to 3c (3a: a U phase, 3b: a V phase, and 3c: a W phase) and lower-arm switching elements 3d to 3f (3d: the U phase, 3e: the V phase, and 3f: the W phase) and a control unit 7 that generates six drive signals corresponding to the phase upper-arm switching elements 3a to 3c and the phase lower-arm switching elements 3d to 3f and outputs the drive signals respectively to the phase upper-arm switching elements 3a to 3c and the phase lower-arm switching elements 3d to 3f. The phase upper-arm switching elements 3a to 3c and the phase lower-arm switching elements 3d to 3f include freewheeling diodes 4a to 4f (4a: a U-phase upper arm, 4b: a V-phase upper arm, 4c: a W-phase upper arm, 4d: a U-phase lower arm, 4e: a V-phase lower arm, and 4f: a W-phase lower arm) connected in reverse parallel to one another.

The control unit 7 is configured by, for example, a microcomputer or a CPU and is computation/control means for converting an input analog voltage signal into a digital value and performing computation/control corresponding to a control application of the motor 9.

The power conversion device 100 according to the first embodiment includes a power-supply shunt resistor 5 provided between a negative voltage side (in the example shown in FIG. 1, GND) of the DC power supply 1 and the inverter 2, phase lower-arm shunt resistors 6a and 6b (6a: the U phase and 6b: the V phase) respectively provided between the phase lower-arm switching elements 3d and 3e of two arms (the U phase and the V phase) among the three arms and the power-supply shunt resistor 5, and phase lower-arm voltage detection units 8a and 8b (8a: the U phase and 8b: the V phase) that detect voltages (hereinafter referred to as "phase lower-arm voltages") Vu and Vv between connection points of the phase lower-arm switching elements 3d and 3e and the phase lower-arm shunt resistors 6a and 6b and a negative voltage side (GND) of the DC power supply 1. Note that, in the example shown in FIG. 1, a resistance value of the power-supply shunt resistor 5 is represented as Rdc and a resistance value of the phase lower-arm shunt resistors 6a and 6b is represented as Rsh.

The phase lower-arm voltage detection units 8a and 8b are configured by, for example, amplifying means for changing the phase lower-arm voltages Vu and Vv to voltage values easily treated by the control unit 7.

Figure 2:
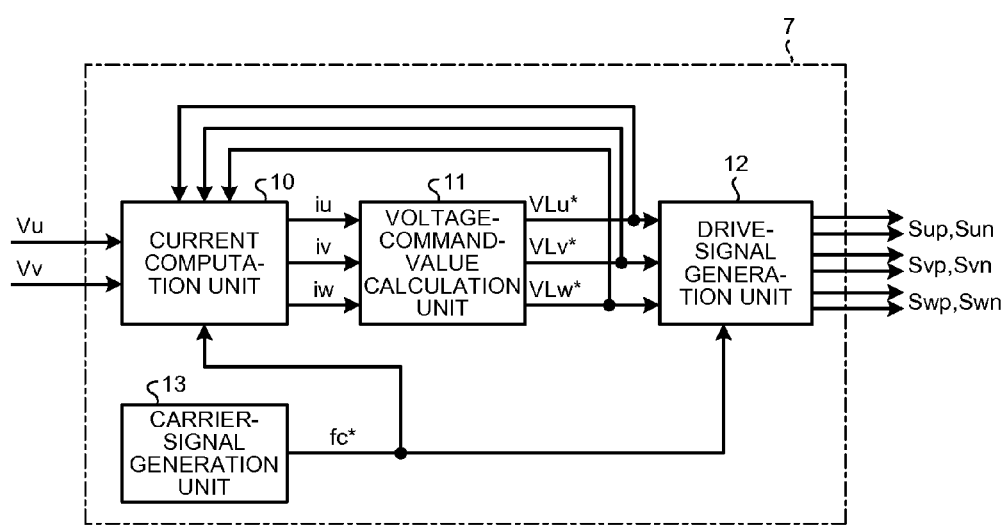
FIG. 2 is a diagram showing a configuration example of a control unit of the power conversion device according to the first embodiment.

FIG. 2 is a diagram showing a configuration example of the control unit of the power conversion device according to the first embodiment. The control unit 7 of the power conversion device 100 according to the first embodiment includes a current computation unit 10 that computes, on the basis of the phase lower-arm voltages Vu and Vv detected by the phase lower-arm voltage detection units 8a and 8b, phase currents iu, iv, and iw flowing to phase winding wires of the motor 9, a voltage-command-value calculation unit 11 that calculates, on the basis of the phase currents iu, iv, and iw output by the current computation unit 10, phase voltage command values VLu*, VLv*, and VLw* output from the inverter 2 to the phase winding wires of the motor 9, a drive-signal generation unit 12 that generates, on the basis of the phase voltage command values VLu*, VLv*, and VLw* output from the voltage-command-value calculation unit 11, drive signals Sup, Sun, Svp, Svn, Swp, and Swn output to the phase upper-arm switching elements 3a to 3c and the phase lower-arm switching elements 3d to 3f, and a carrier-signal generation unit 13 that generates a carrier signal fc* such as a triangular wave or a saw-tooth wave serving as a reference frequency of the drive signals Sup, Sun, Svp, Svn, Swp, and Swn.

The current computation unit 10 discriminates, from the phase voltage command value VLu*, VLv*, and VLw* output from the voltage-command-value calculation unit 11 and the carrier signal fc* output from the carrier-signal generation unit 13, ON/OFF states of the phase upper-arm switching elements 3a to 3c in a space vector modulation system explained below and computes the phase currents iu, iv, and iw corresponding to the ON/OFF states of the phase upper-arm switching elements 3a to 3c. A computation method for the phase currents iu, iv, and iw corresponding to the ON/OFF states of the phase upper-arm switching elements 3a to 3c in the space vector modulation system is explained below.

The voltage-command-value calculation unit 11 calculates, according to the phase currents iu, iv, and iw output from the current computation unit 10, the phase voltage command values VLu*, VLv*, and VLw* converted into on-duties (i.e., ratios of ON times of the phase upper-arm switching elements 3a to 3c and the phase lower-arm switching elements 3d to 3f in one switching cycle) of the drive signals Sup, Sun, Svp, Svn, Swp, and Swn output from the drive-signal generation unit 12.

The drive-signal generation unit 12 compares the phase voltage command values VLu*, VLv*, and VLw* output from the voltage-command-value calculation unit 11 and the carrier signal fc* output from the carrier-signal generation unit 13 and generates, according to a magnitude relation between the phase voltage command values VLu*, VLv*, and VLw* and the carrier signal fc*, the drive signals Sup, Sun, Svp, Svn, Swp, and Swn output to the switching elements 3a to 3f.

Note that the configuration of the control unit 7 explained above is a configuration example for controlling the motor 9 functioning as the load device. The present invention is not limited by the configuration and a control method of the control unit 7.

Figure 3:
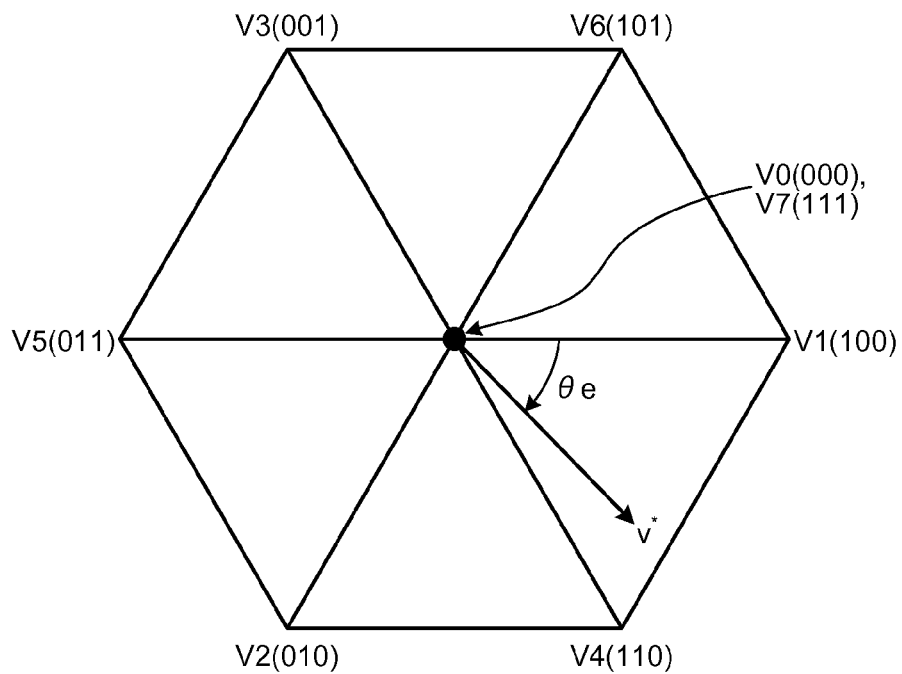
FIG. 3 is a diagram showing a relation between ON/OFF states of phase upper-arm switching elements in a space vector modulation system and an output voltage vector of an inverter.

Subsequently, the space vector modulation system for generating drive signals to the phase upper-arm switching elements 3a to 3c and the phase lower-arm switching elements 3d to 3f by PWM modulation is explained. FIG. 3 is a diagram showing ON/OFF states of the phase upper-arm switching elements in the space vector modulation system and an output voltage vector of the inverter. FIG. 3(*a*) is a schematic diagram showing a relation between ON/OFF states of the phase upper-arm switching elements 3a to 3c and an output voltage vector of the inverter 2. FIG. 3(*b*) shows a definition of the output voltage vector of the inverter 2. Note that, in the example shown in FIG. 3, the ON state of the phase upper-arm switching elements 3a to 3c is defined as "1" and the OFF state is defined as "0".

As shown in FIG. 3, as the ON/OFF states of the phase upper-arm switching elements 3a to 3c, there are two states: the ON state (i.e., "1") and the OFF state (i.e., "0").

According to combinations of the ON/OFF states of the phase upper-arm switching elements 3a to 3c, when the output voltage vector of the inverter 2 is defined in a form of ((a state of the U-phase upper-arm switching element 3a)(a state of the V-phase upper-arm switching element 3b)(a state of the W-phase upper-arm switching element 3c), there are eight vectors V0(000), V1(100), V2(010), V3(001), V4(110), V5(011), V6(101), and V7(111). Among the output voltage vectors of the inverter, V0(000) and V7(111) not having magnitude are referred to as zero vectors. The other vectors V1(100), V2(010), V3(001), V4(110), V5(011), and V6(101) having equal magnitude and having a phase difference of 60 degrees one another are referred to as real vectors.

The control unit 7 combines the zero vectors V0 and V7 and the real vectors V1 to V6 in any combinations and generates drive signals of a three-phase PWM voltage corresponding to the phase upper-arm switching elements 3a to 3c and the phase lower-arm switching elements 3d to 3f.

A computation method for the phase currents iu, iv, and iw in the power conversion device 100 according to the first embodiment is explained with reference to FIG. 4 to FIG. 10.

Figure 4:
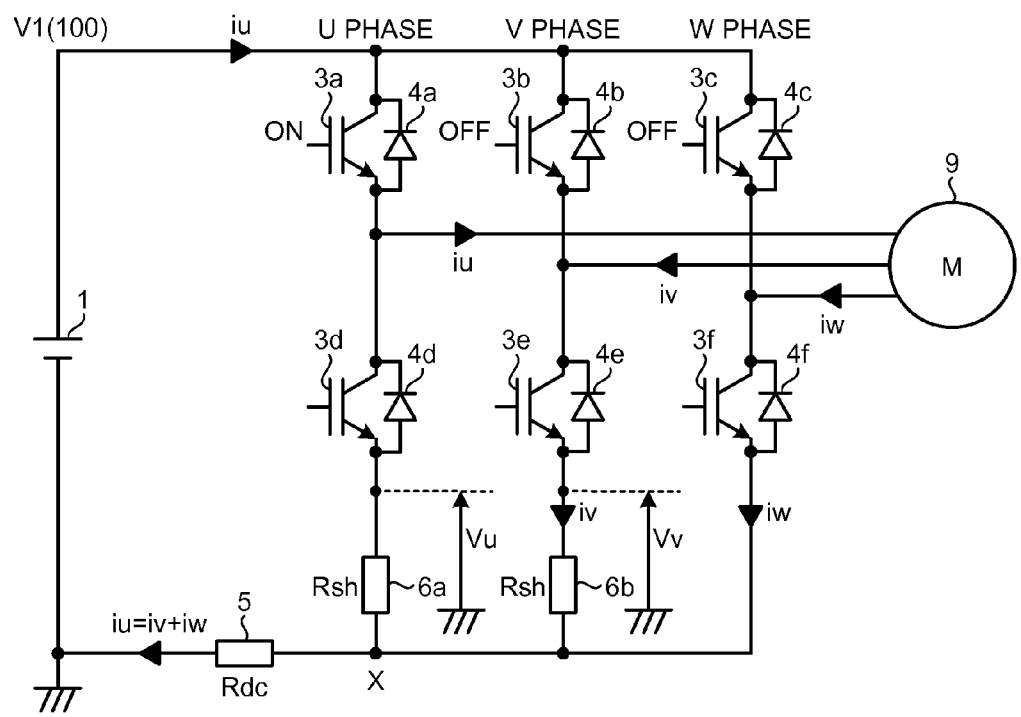
FIG. 4 is a diagram showing electric currents flowing to units of the inverter when the output voltage vector of the inverter is a real vector V1(100).

FIG. 4 is a diagram showing electric currents flowing to the units of the inverter when the output voltage vector of the inverter is the real vector V1(100). In an example shown in FIG. 4, the phase currents iu, iv, and iw flowing from a high potential side to a low potential side of the phase winding wires of the motor 9 are set to positive values. Note that, in examples shown in the figures referred to below, descriptions are the same as the description in FIG. 4.

As shown in FIG. 4, when the output voltage vector of the inverter 2 is the real vector V1(100), the U-phase current iu flows from the positive voltage side of the DC power supply 1 to the motor 9 via the U-phase upper-arm switching element 3a, the V-phase current iv flows from the motor 9 to the negative voltage side of the DC power supply 1 via the V-phase lower-arm switching element 3e, the V-phase lower-arm shunt resistor 6b, and the power-supply shunt resistor 5, and the W-phase current iw flows to the negative voltage side of the DC power supply 1 via the W-phase lower-arm switching element 3f and the power-supply shunt resistor 5. At this point, the U-phase lower-arm voltage Vu and the V-phase lower-arm voltage Vv can be represented by the following Formulas (1) and (2).

$$Vu = iu \times Rdc \quad (1)$$

$$Vv = iu \times Rdc + iv \times Rsh \quad (2)$$

When the first law of Kirchhoff is applied at an X point shown in FIG. 4, $$iu = iv + iw \quad (3)$$

That is, when the output voltage vector of the inverter 2 is the real vector V1(100), the phase currents iu, iv, and iw can be calculated using the above Formulas (1), (2), and (3).

Figure 5:
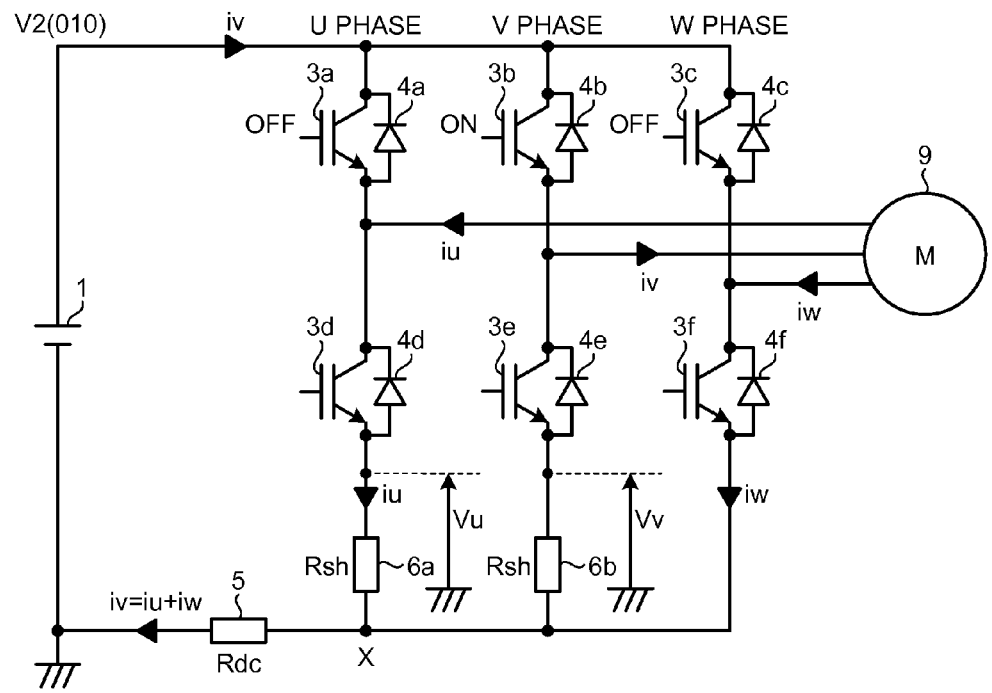
FIG. 5 is a diagram showing electric currents flowing to the units of the inverter when the output voltage vector of the inverter is a real vector V2(010).

FIG. 5 is a diagram showing electric currents flowing to the units of the inverter when the output voltage vector of the inverter is the real vector V2(010).

As shown in FIG. 5, when the output voltage vector of the inverter 2 is the real vector V2(010), the V-phase current iv flows from the positive voltage side of the DC power supply 1 to the motor 9 via the V-phase upper-arm switching element 3b, the U-phase current iu flows from the motor 9 to the negative voltage side of the DC power supply 1 via the U-phase lower-arm switching element 3d, the U-phase lower-arm shunt resistor 6a, and the power-supply shunt resistor 5, and the W-phase current iw flows to the negative voltage side of the DC power supply 1 via the W-phase lower-arm switching element 3f and the power-supply shunt resistor 5. At this point, the U-phase lower-arm voltage Vu and the V-phase lower-arm voltage Vv can be represented by the following Formulas (4) and (5).

$$Vu=iv \times Rdc+iu \times Rsh \quad (4)$$

$$Vv=iv \times Rdc \quad (5)$$

When the first law of Kirchhoff is applied at an X point shown in FIG. 5, $$iv=iu+iw \quad (6)$$

That is, when the output voltage vector of the inverter 2 is the real vector V2(010), the phase currents iu, iv, and iw can be calculated using the above Formulas (4), (5), and (6).

Figure 6:
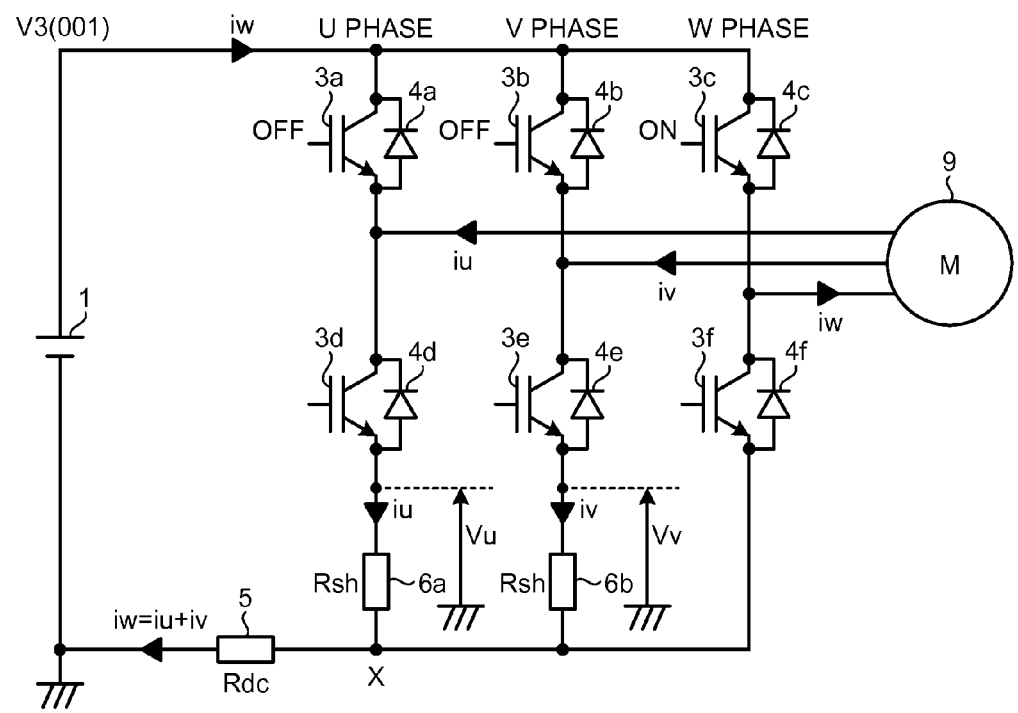
FIG. 6 is a diagram showing electric currents flowing to the units of the inverter when the output voltage vector of the inverter is a real vector V3(001).

FIG. 6 is a diagram showing electric currents flowing to the units of the inverter when the output voltage vector of the inverter is the real vector V3(001).

As shown in FIG. 6, when the output voltage vector of the inverter 2 is the real vector V3(001), the W-phase current iw flows from the positive voltage side of the DC power supply 1 to the motor 9 via the W-phase upper-arm switching element 3c, the U-phase current iu flows from the motor 9 to the negative voltage side of the DC power supply 1 via the U-phase lower-arm switching element 3d, the U-phase lower-arm shunt resistor 6a, and the power-supply shunt resistor 5, and the V-phase current iv flows to the negative voltage side of the DC power supply 1 via the V-phase lower-arm switching element 3e and the power-supply shunt resistor 5. At this point, the U-phase lower-arm voltage Vu and the V-phase lower-arm voltage Vv can be represented by the following Formulas (7) and (8).

$$Vu=iw \times Rdc+iu \times Rsh \quad (7)$$

$$Vv=iw \times Rdc+iv \times Rsh \quad (8)$$

When the first law of Kirchhoff is applied at an X point shown in FIG. 6, $$iw=iu+iv \quad (9)$$

That is, when the output voltage vector of the inverter 2 is the real vector V3(001), the phase currents iu, iv, and iw can be calculated using the above Formulas (7), (8), and (9).

Figure 7:
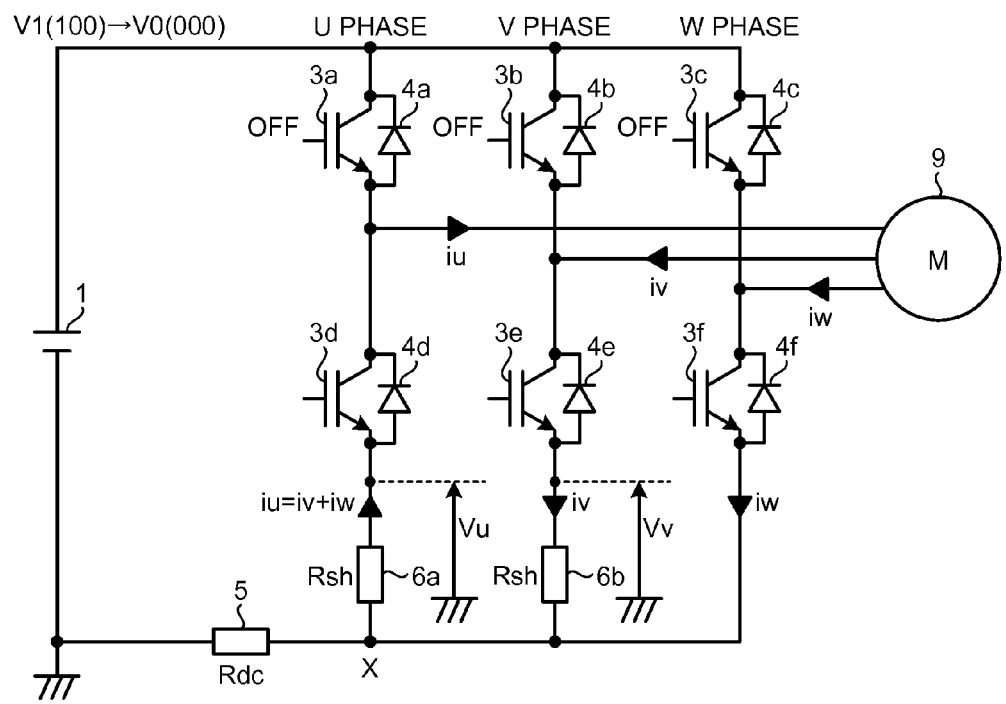
FIG. 7 is a diagram showing electric currents flowing to the units of the inverter when the output voltage vector of the inverter is a zero vector V0(000).

FIG. 7 is a diagram showing electric currents flowing to the units of the inverter when the output voltage vector of the inverter is the zero vector V0(000). In an example shown in FIG. 7, as an example, electric currents flowing to the inverter 2 when the output voltage vector shifts from the real vector V1(100) to the zero vector V0(000) is shown.

As shown in FIG. 7, when the output voltage vector of the inverter 2 shifts from the real vector V1(100) to the zero vector V0(000), an electric current hardly flows to the power-supply shunt resistor 5 and a voltage at the X point is approximately zero. At this point, the U-phase current iu flows from the X point to the motor 9 via the freewheeling diode 4d, the V-phase current iv flows from the motor 9 to the X point via the V-phase lower-arm switching element 3e and the V-phase lower-arm shunt resistor 6b, and the W-phase current iw flows to the X point via the W-phase lower-arm switching element 3f. At this point, the U-phase lower-arm voltage Vu and the V-phase lower-arm voltage Vv can be represented by the following two formulas.

$$Vu=(-iu) \times Rsh \quad (10)$$

$$Vv=iv \times Rsh \quad (11)$$

When the first law of Kirchhoff is applied at the X point, $$iu=iv+iw \quad (12)$$

That is, when the output voltage vector of the inverter 2 shifts from the real vector V1(100) to the zero vector V0(000), the phase currents iu, iv, and iw can be calculated using the above Formulas (10), (11), and (12).

As explained above, in the power conversion device 100 according to this embodiment, when the output voltage vector of the inverter 2 is the real vectors V1(100), V2(010), and V3(001) and the zero vector V0(000), the phase currents iu, iv, and iw flowing to the phase winding wires of the motor 9 can be calculated by detecting the U-phase lower-arm voltage Vu and the V-phase lower-arm voltage Vv.

Figure 8:
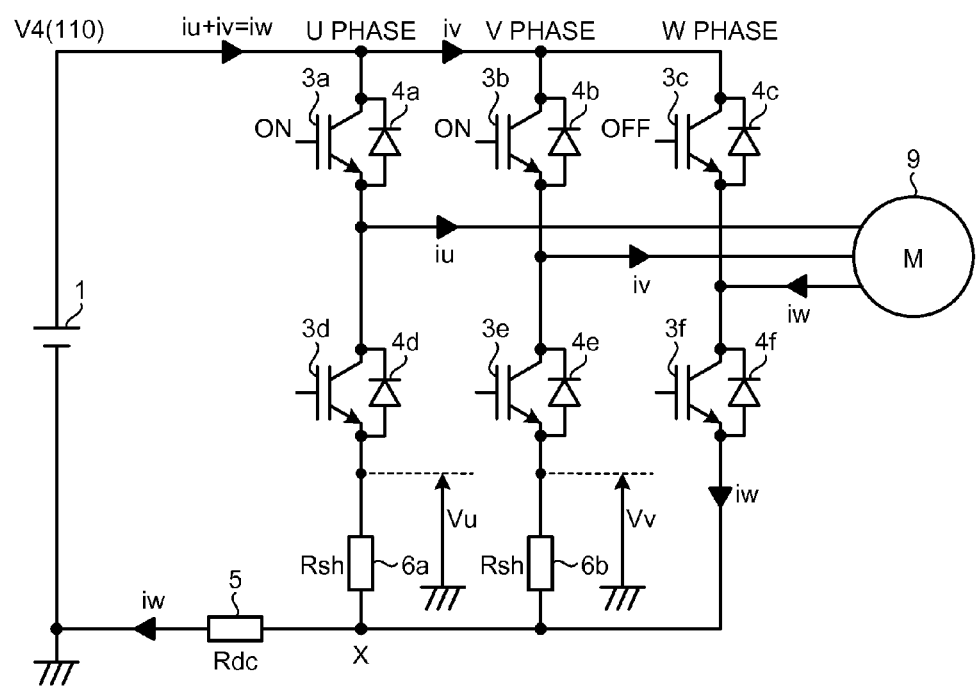
FIG. 8 is a diagram showing electric currents flowing to the units of the inverter when the output voltage vector of the inverter is a real vector V4(110).

FIG. 8 is a diagram showing electric currents flowing to the units of the inverter when the output voltage vector of the inverter is the real vector V4(110).

As shown in FIG. 8, when the output voltage vector of the inverter 2 is the real vector V4(110), the U-phase current iu flows from the positive voltage side of the DC power supply 1 to the motor 9 via the U-phase upper-arm switching element 3a, the V-phase current iv flows to the motor 9 via the V-phase upper-arm switching element 3b, and the W-phase current iw flows from the motor 9 to the negative voltage side of the DC power supply 1 via the W-phase lower-arm switching element 3f and the power-supply shunt resistor 5. At this point, the U-phase lower-arm voltage Vu and the V-phase lower-arm voltage Vv can be represented by the following Formula (13) and (14).

$$Vu=iw \times Rdc \quad (13)$$

$$Vv=iw \times Rdc \quad (14)$$

When the motor 9 is a three-phase balanced load, according to an equilibrium condition of phase currents, $$iu+iv=iw \quad (15)$$

$$iu=iv=(\tfrac{1}{2})iw \quad (16)$$

That is, when the output voltage vector of the inverter 2 is the real vector V4(110) and the motor 9 is the three-phase balanced load, the phase currents iu, iv, and iw can be calculated using one of the above Formulas (13) and (14) and Formula (16).

Figure 9:
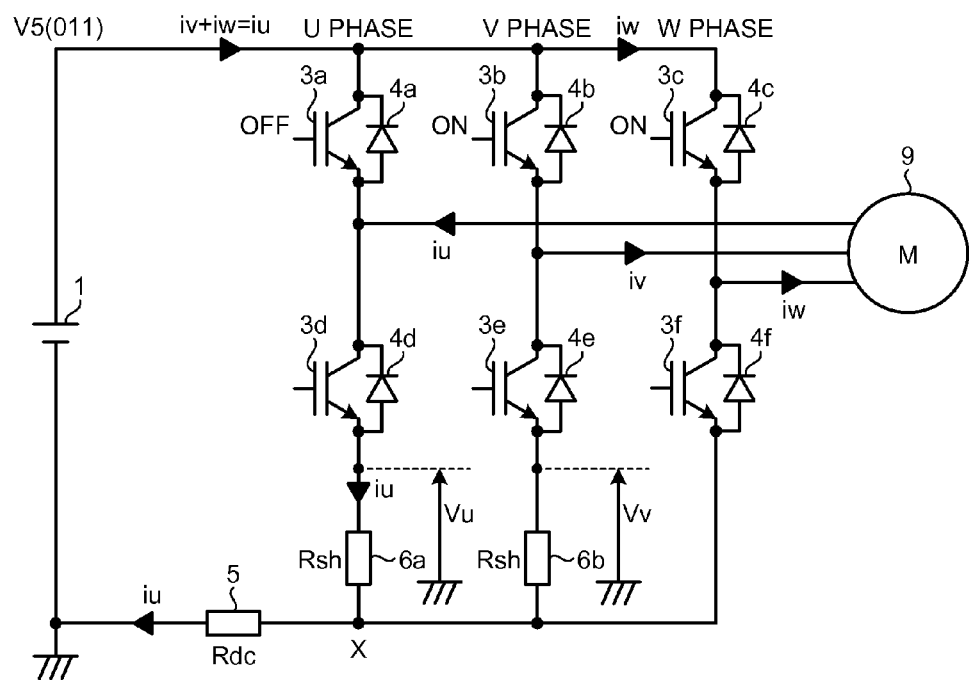
FIG. 9 is a diagram showing electric currents flowing to the units of the inverter when the output voltage vector of the inverter is a real vector V5(011).

FIG. 9 is a diagram showing electric currents flowing to the units of the inverter when the output voltage vector of the inverter is the real vector V5(011).

As shown in FIG. 9, when the output voltage vector of the inverter 2 is the real vector V5(011), the V-phase current iv flows from the positive voltage side of the DC power supply 1 to the motor 9 via the V-phase upper-arm switching element 3b, the W-phase current iw flows to the motor 9 via the W-phase upper-arm switching element 3c, and the U-phase current iu flows from the motor 9 to the negative voltage side of the DC power supply 1 via the U-phase lower-arm switching element 3d, the U-phase lower-arm shunt resistor 6a, and the power-supply shunt resistor 5. At this point, the U-phase lower-arm voltage Vu and the V-phase lower-arm voltage Vv can be represented by the following Formula (17) and (18).

$$Vu=iu \times Rdc+iu \times Rsh \quad (17)$$

$$Vv=iu \times Rdc \quad (18)$$

When the motor 9 is the three-phase balanced load, according to the equilibrium condition of phase currents, $$iv+iw=iu \quad (19)$$

$$iv=iw=(½)iu \quad (20)$$

That is, when the output voltage vector of the inverter 2 is the real vector V5(011) and the motor 9 is the three-phase balanced load, the phase currents iu, iv, and iw can be calculated using one of the above Formulas (17) and (18) and Formula (20).

Figure 10:
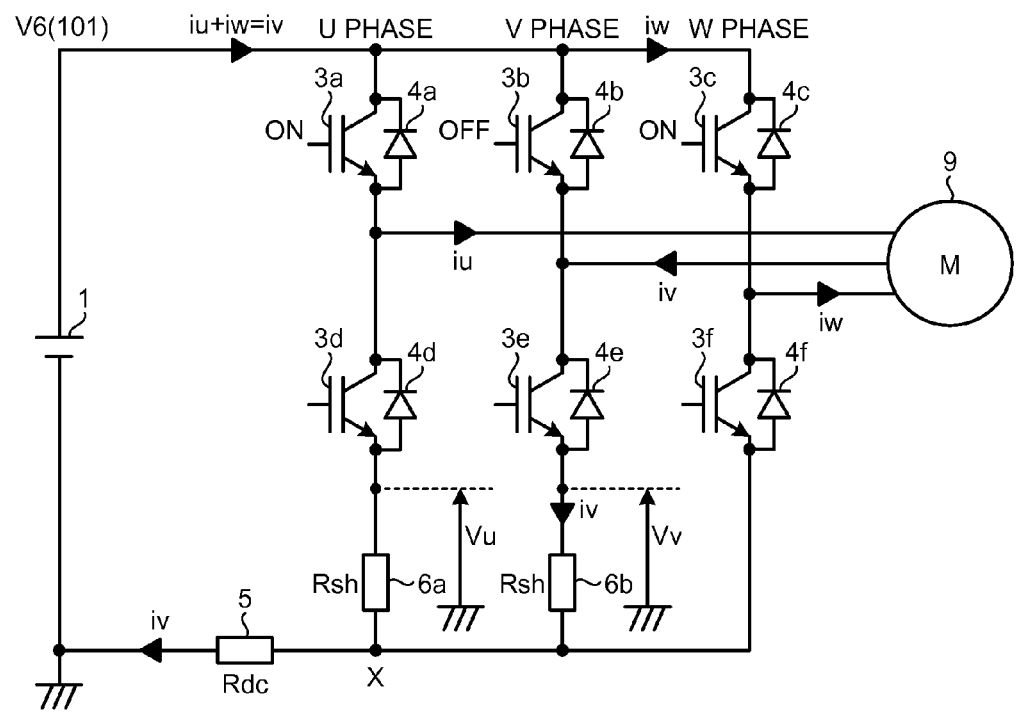
FIG. 10 is a diagram showing electric currents flowing to the units of the inverter when the output voltage vector of the inverter is a real vector V6(101).

FIG. 10 is a diagram showing electric currents flowing to the units of the inverter when the output voltage vector of the inverter is the real vector V6(101).

As shown in FIG. 10, when the output voltage vector of the inverter 2 is the real vector V6(101), the U-phase current iu flows from the positive voltage side of the DC power supply 1 to the motor 9 via the U-phase upper-arm switching element 3a, the W-phase current iw flows to the motor 9 via the W-phase upper-arm switching element 3c, and the V-phase current iv flows from the motor 9 to the negative voltage side of the DC power supply 1 via the V-phase lower-arm switching element 3e, the V-phase lower-arm shunt resistor 6b, and the power-supply shunt resistor 5. At this point, the U-phase lower-arm voltage Vu and the V-phase lower-arm voltage Vv can be represented by the following Formulas (21) and (22).

$$Vu=iv×Rdc \quad (21)$$

$$Vv=iv×Rdc+iv×Rsh \quad (22)$$

When the motor 9 is the three-phase balanced load, according to the equilibrium condition of phase currents, $$iu+iw=iv \quad (23)$$

$$iu=iw=(½)iv \quad (24)$$

That is, when the output voltage vector of the inverter 2 is the real vector V6(101) and the motor 9 is the three-phase balanced load, the phase currents iu, iv, and iw can be calculated using one of the above Formulas (21) and (22) and Formula (24).

As explained above, in the power conversion device 100 according to this embodiment, when the output voltage vector of the inverter 2 is the real vectors V4(110), V5(011), and V6(101) as well, when the motor 9 is the three-phase balanced load, the phase currents iu, iv, and iw flowing to the phase winding wires of the motor 9 can be calculated by detecting one of the U-phase lower-arm voltage Vu and the V-phase lower-arm voltage Vv.

As explained above, the power conversion device in the first embodiment includes the power-supply shunt resistor provided between the negative voltage side of the DC power supply and the inverter and the phase lower-arm shunt resistors respectively provided between the two phase lower arm switching elements among the three arms and the power-supply shunt resistor. The power conversion device detects the two phase lower-arm voltages, which are the voltages between the connection points of the phase lower-arm switching elements and the phase lower-arm shunt resistors and the negative voltage side of the DC power supply, and calculates, on the basis of the detection values of the phase lower-arm voltages, the phase currents flowing to the load device. Therefore, the number of the voltage detection units configured by the amplifying means can be two. It is possible to attain a further reduction in the size and a further reduction in the costs of the device than the conventional configuration in which the phase lower-arm shunt resistors for two phases and the power-supply shunt resistor are provided in the same manner.

Not only in the ON/OFF states of the phase upper-arm switching elements, that is, when the output voltage vector of the inverter is the zero vector V0 but also when the output voltage vector of the inverter is the real vectors V1 to V6, the phase currents can be calculated on the basis of the two phase lower-arm voltages. It is possible to attain improvement of accuracy of the control based on the phase currents.

Second Embodiment

In the first embodiment, the method of connecting the lower-arm shunt resistors to the lower-arm switching elements of the two phases among the U phase, the V phase, and the W phase and detecting the lower-arm voltages of the two phases to thereby calculate the phase currents iu, iv, and iw flowing to the load device is explained. In this embodiment, a method of connecting the lower-arm shunt resistors to the phase lower-arm switching elements of the U phase, the V phase, and the W phase and detecting the lower-arm voltages of the three phases to calculate the phase currents iu, iv, and iw flowing to the load device is explained.

Figure 11:
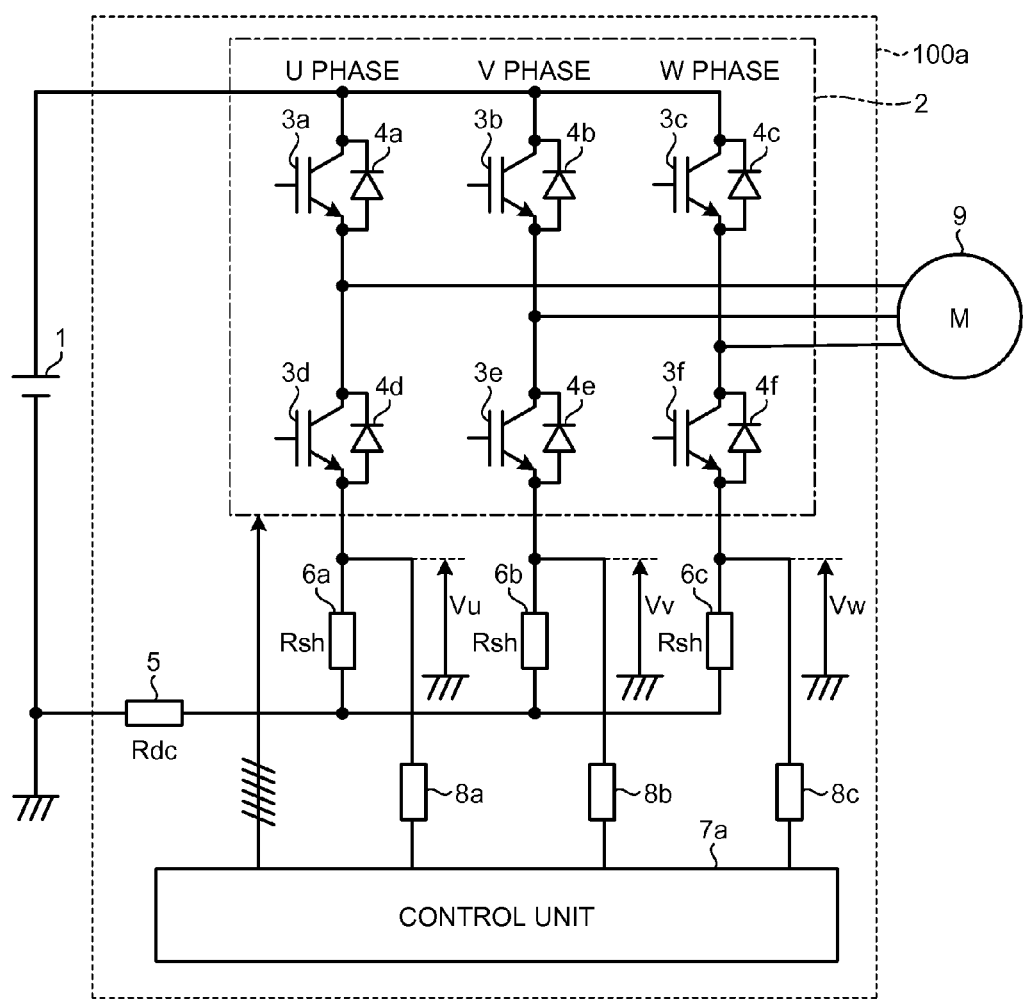
FIG. 11 is a diagram showing a configuration example of a power conversion device according to a second embodiment.

FIG. 11 is a diagram showing a configuration example of a power conversion device according to the second embodiment. Note that components same as or equivalent to the components in the first embodiment are denoted by the same reference numerals and signs and detailed explanation of the components is omitted.

A power conversion device 100a according to the second embodiment includes, in addition to the components in the first embodiment, a W-phase lower-arm shunt resistor 6c provided between the W-phase lower-arm switching element 3f and the power-supply shunt resistor 5 and a W-phase lower-arm voltage detection unit 8c that detects a voltage (a W-phase lower-arm voltage) Vw between a connection point of the W-phase lower-arm switching element 3f and the W-phase lower-arm shunt resistor 6c and the negative voltage side (GND) of the DC power supply 1. Note that, in the example shown in FIG. 11, a resistance value of the W-phase lower-arm shunt resistor 6c is represented as Rsh like the resistance values of the phase lower-arm shunt resistors 6a and 6b.

Like the U-phase lower-arm voltage detection unit 8a and the V-phase lower-arm voltage detection unit 8b, the W-phase lower-arm voltage detection unit 8c is configured by amplifying means for changing the W-phase lower-arm voltage Vw to a voltage value easily treated by a control unit 7a.

Figure 12:
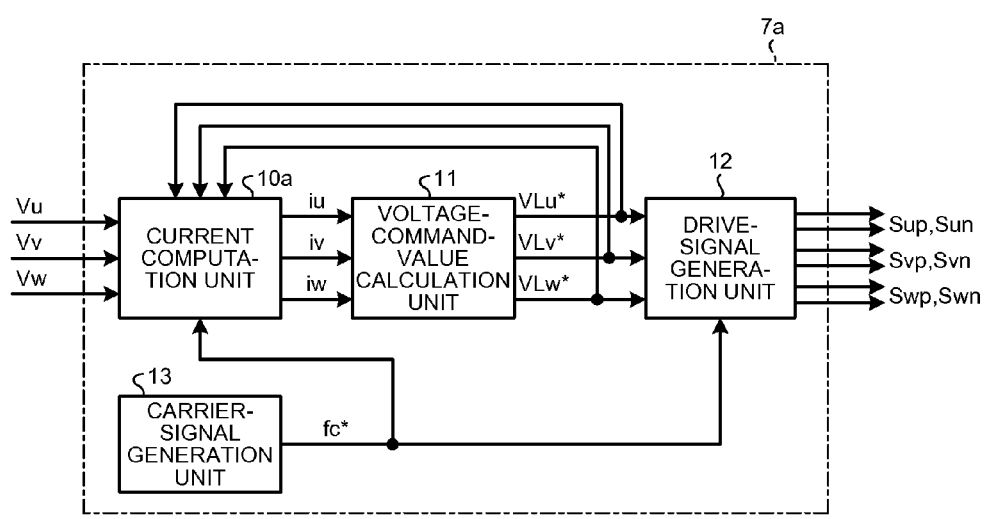
FIG. 12 is a diagram showing a configuration example of a control unit of the power conversion device according to the first embodiment.

FIG. 12 is a diagram showing a configuration example of the control unit of the power conversion device according to the first embodiment. The control unit 7a of the power conversion device 100a according to the second embodiment includes, instead of the current computation unit 10 in the first embodiment, a current computation unit 10a that computes, on the basis of the phase lower-arm voltages Vu, Vv, and Vw detected by the phase lower-arm voltage detection units 8a, 8b, and 8c, the phase currents iu, iv, and iw flowing to the phase winding wires of the motor 9.

A computation method for the phase currents in the power conversion device 100a according to the second embodiment is explained with reference to FIG. 13 to FIG. 19.

Figure 13:
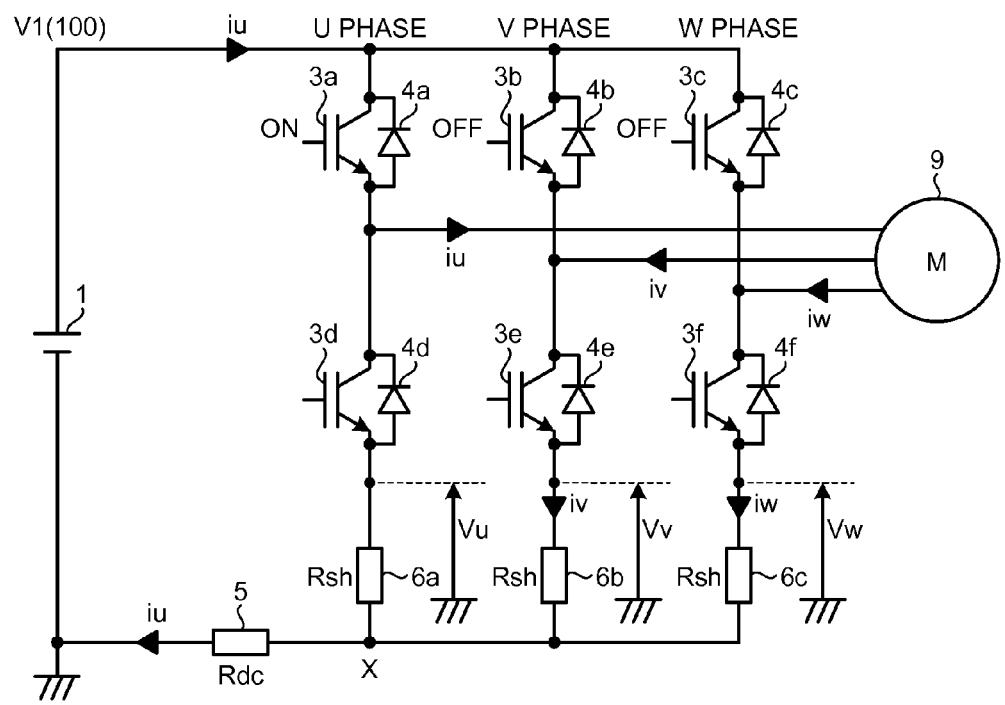
FIG. 13 is a diagram showing electric currents flowing to units of an inverter when an output voltage vector of the inverter is the real vector V1(100).

FIG. 13 is a diagram showing electric currents flowing to the units of the inverter when the output voltage vector of the inverter is the real vector V1(100). In an example shown in FIG. 13, electric currents flowing from the high-potential side to the low-potential side of the phase winding wires of the motor 9 are respectively represented as iu, iv, and iw. Note that, in examples shown in the figures referred to below, descriptions are the same as the description in FIG. 13.

As shown in FIG. 13, when the output voltage vector of the inverter 2 is the real vector V1(100), the U-phase current iu flows from the positive voltage side of the DC power supply 1 to the motor 9 via the U-phase upper-arm switching element 3*a*, the V-phase current iv flows from the motor 9 to the negative voltage side of the DC power supply 1 via the V-phase lower-arm switching element 3*e*, the V-phase lower-arm shunt resistor 6*b*, and the power-supply shunt resistor 5, and the W-phase current iw flows to the negative voltage side of the DC power supply 1 via the W-phase lower-arm switching element 3*f* and the power-supply shunt resistor 5. At this point, the U-phase lower-arm voltage Vu, the V-phase lower-arm voltage Vv, and the W-phase lower-arm voltage Vw can be represented by the following Formulas (25), (26), and (27).

$$Vu = iu \times Rdc \tag{25}$$

$$Vv = iu \times Rdc + iv \times Rsh \tag{26}$$

$$Vw = iu \times Rdc + iw \times Rsh \tag{27}$$

That is, the phase currents iu, iv, and iw can be calculated using the above Formulas (25), (26), and (27).

Figure 14:
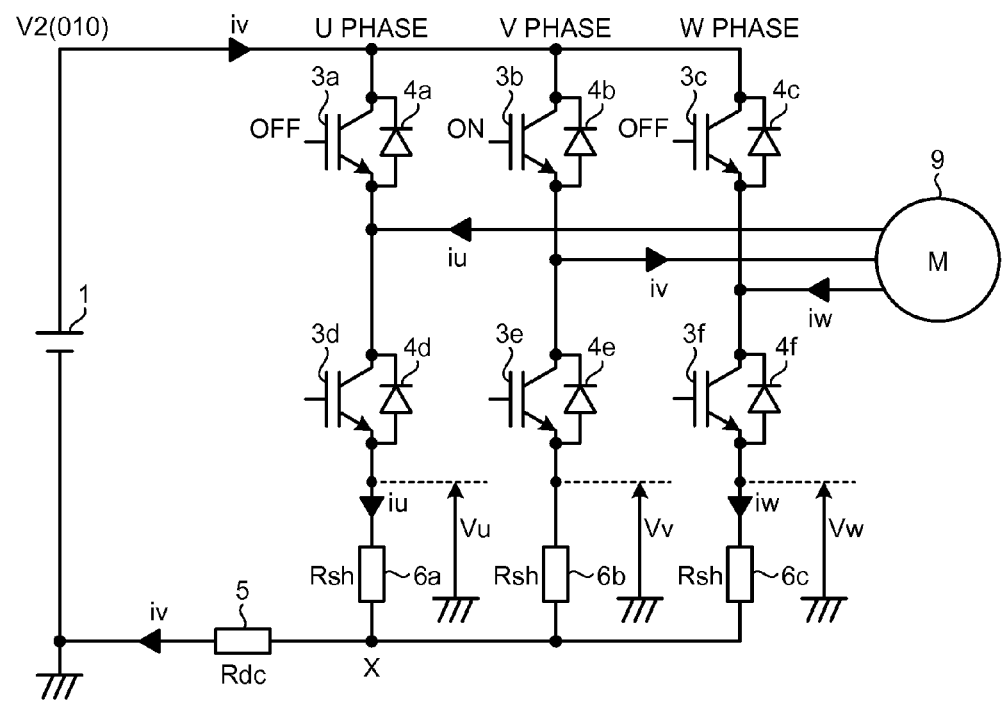
FIG. 14 is a diagram showing electric currents flowing to the units of the inverter when the output voltage vector of the inverter is the real vector V2(010).

FIG. 14 is a diagram showing electric currents flowing to the units of the inverter when the output voltage vector of the inverter is the real vector V2(010).

As shown in FIG. 14, when the output voltage vector of the inverter 2 is the real vector V2(010), the V-phase current iv flows from the positive voltage side of the DC power supply 1 to the motor 9 via the V-phase upper-arm switching element 3*b*, the U-phase current iu flows from the motor 9 to the negative voltage side of the DC power supply 1 via the U-phase lower-arm switching element 3*d*, the U-phase lower-arm shunt resistor 6*a*, and the power-supply shunt resistor 5, and the W-phase current iw flows to the negative voltage side terminal of the DC power supply 1 via the W-phase lower-arm switching element 3*f* and the power-supply shunt resistor 5. At this point, the U-phase lower-arm voltage Vu, the V-phase lower-arm voltage Vv, and the W-phase lower-arm voltage Vw can be represented by the following Formulas (28), (29), and (30).

$$Vu = iv \times Rdc + iu \times Rsh \tag{28}$$

$$Vv = iv \times Rdc \tag{29}$$

$$Vw = iv \times Rdc + iw \times Rsh \tag{30}$$

That is, the phase currents iu, iv, and iw can be calculated using the above Formulas (28), (29), and (30).

Figure 15:
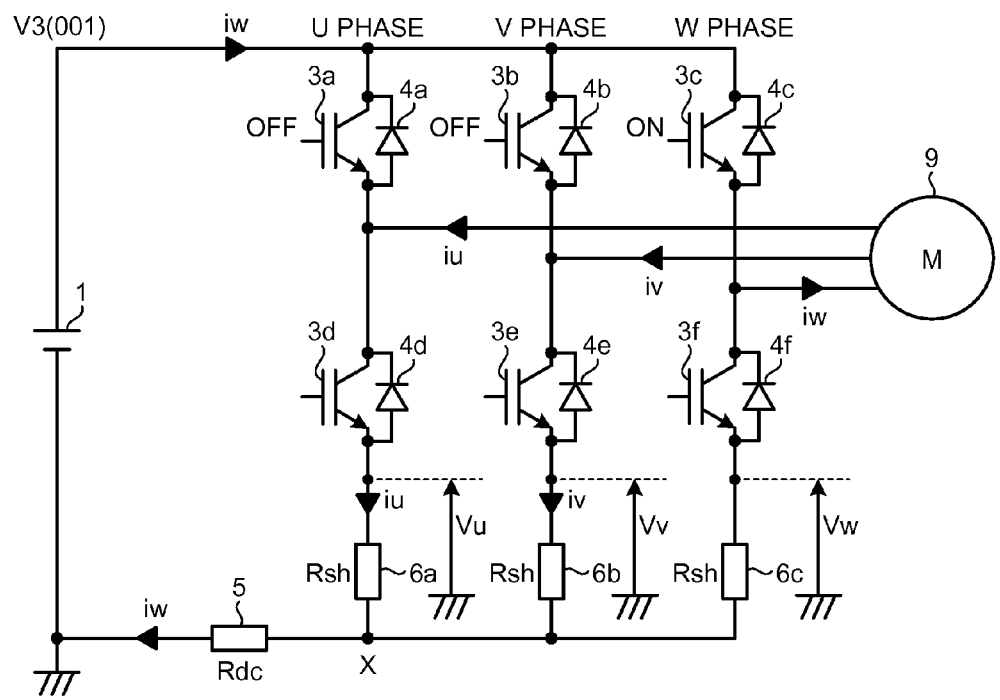
FIG. 15 is a diagram showing electric currents flowing to the units of the inverter when the output voltage vector of the inverter is the real vector V3(001).

FIG. 15 is a diagram showing electric currents flowing to the units of the inverter when the output voltage vector of the inverter is the real vector V3(001).

As shown in FIG. 15, when the output voltage vector of the inverter 2 is the real vector V3(001), the W-phase current iw flows from the positive voltage side of the DC power supply 1 to the motor 9 via the W-phase upper-arm switching element 3*c*, the U-phase current iu flows from the motor 9 to the negative voltage side of the DC power supply 1 via the U-phase lower-arm switching element 3*d*, the U-phase lower-arm shunt resistor 6*a*, and the power-supply shunt resistor 5, and the V-phase current iv flows to the negative voltage side of the DC power supply 1 via the V-phase lower-arm switching element 3*e* and the power-supply shunt resistor 5. At this point, the U-phase lower-arm voltage Vu, the V-phase lower-arm voltage Vv, and the W-phase lower-arm voltage Vw can be represented by the following Formulas (31), (32), and (33).

$$Vu = iw \times Rdc + iu \times Rsh \tag{31}$$

$$Vv = iw \times Rdc + iv \times Rsh \tag{32}$$

$$Vw = iw \times Rdc \tag{33}$$

That is, the phase currents iu, iv, and iw can be calculated using the above Formulas (31), (32), and (33).

Figure 16:
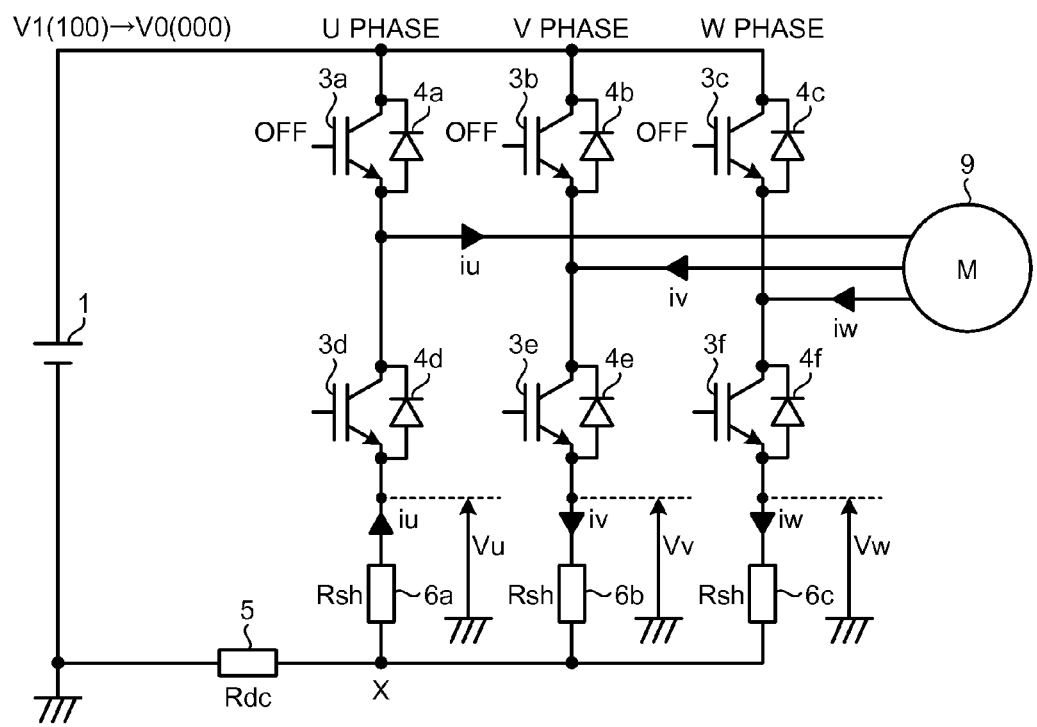
FIG. 16 is a diagram showing electric currents flowing to the units of the inverter when the output voltage vector of the inverter is the zero vector V0(000).

FIG. 16 is a diagram showing electric currents flowing to the units of the inverter when the output voltage vector of the inverter is the zero vector V0(000). In an example shown in FIG. 16, as an example, electric currents flowing to the inverter 2 when the output voltage vector shifts from the real vector V1(100) to the zero vector V0(000) is shown.

As shown in FIG. 16, when the output voltage vector of the inverter 2 shifts from the real vector V1(100) to the zero vector V0(000), an electric current hardly flows to the power-supply shunt resistor 5 and a voltage at the X point is approximately zero. At this point, the U-phase current iu flows from the X point to the motor 9 via the freewheeling diode 4*d*, the V-phase current iv flows from the motor 9 to the X point via the V-phase lower-arm switching element 3*e* and the V-phase lower-arm shunt resistor 6*b*, and the W-phase current iw flows to the X point via the W-phase lower-arm switching element 3*f*. At this point, the U-phase lower-arm voltage Vu, the V-phase lower-arm voltage Vv, and the W-phase lower-arm voltage Vw can be represented by the following Formulas (34), (35), and (36).

$$Vu = (-iu) \times Rsh \tag{34}$$

$$Vv = iw \times Rsh \tag{35}$$

$$Vw = iw \times Rsh \tag{36}$$

That is, the phase currents iu, iv, and iw can be calculated using the above Formulas (34), (35), and (36).

As explained above, in the power conversion device 100*a* according to this embodiment, when the output voltage vector of the inverter 2 is the real vectors V1(100), V2(010), and V3(001) and the zero vector V0(000), the phase currents iu, iv, and iw flowing to the phase winding wires of the motor 9 can be calculated by detecting the U-phase lower-arm voltage Vu, the V-phase lower-arm voltage Vv, and the W-phase lower-arm voltage Vw.

The phase currents iu, iv, and iw are obtained without using the first law of Kirchhoff and the equilibrium condition of phase currents. Therefore, the power conversion device 100*a* can also be applied even when the motor 9 is an unbalanced load.

Figure 17:
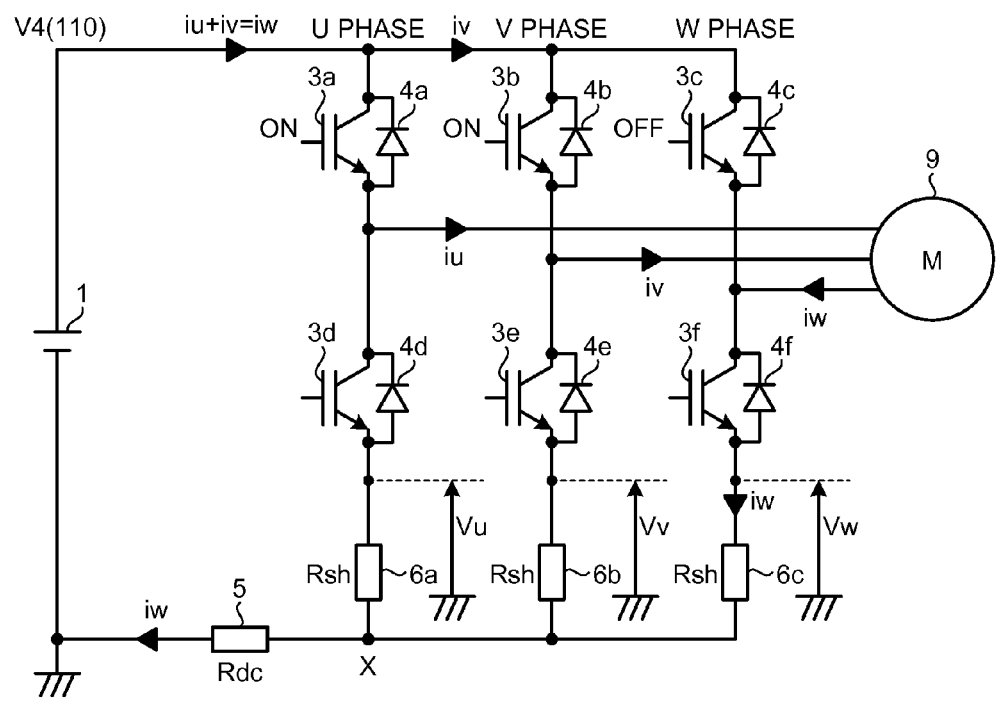
FIG. 17 is a diagram showing electric currents flowing to the units of the inverter when the output voltage vector of the inverter is the real vector V4(110).

FIG. 17 is a diagram showing electric currents flowing to the units of the inverter when the output voltage vector of the inverter is the real vector V4(110).

As shown in FIG. 17, when the output voltage vector of the inverter 2 is the real vector V4(110), the U-phase current iu flows from the positive voltage side of the DC power supply 1 to the motor 9 via the U-phase upper-arm switching element 3*a*, the V-phase current iv flows to the motor 9 via the V-phase upper-arm switching element 3*b*, and the W-phase current iw flows from the motor 9 to the negative voltage side of the DC power supply 1 via the W-phase lower-arm switching element 3*f*, the W-phase lower-arm shunt resistor 6*c*, and the power-supply shunt resistor 5. At this point, the U-phase lower-arm voltage Vu, the V-phase lower-arm voltage Vv, and the W-phase lower-arm voltage Vw can be represented by the following Formula (37), (38), and (39).

$$Vu = iw \times Rdc \quad (37)$$

$$Vv = iw \times Rdc \quad (38)$$

$$Vw = iw \times Rdc + iw \times Rsh \quad (39)$$

When the motor 9 is the three-phase balanced load, according to the equilibrium condition of phase currents, $$iu + iv = iw \quad (40)$$

$$iu = iv = (\tfrac{1}{2})iw \quad (41)$$

That is, when the motor 9 is the three-phase balanced load, the phase currents iu, iv, and iw can be calculated using any one of the above Formulas (37), (38), and (39) and Formula (41).

Figure 18:
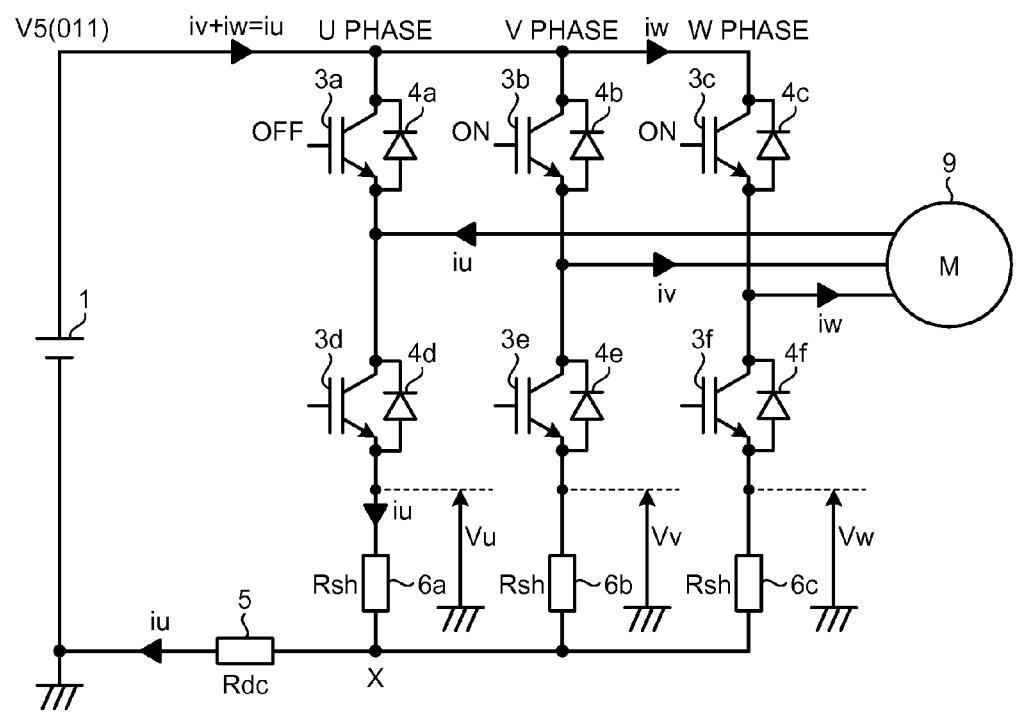
FIG. 18 is a diagram showing electric currents flowing to the units of the inverter when the output voltage vector of the inverter is the real vector V5(011).

FIG. 18 is a diagram showing electric currents flowing to the units of the inverter when the output voltage vector of the inverter is the real vector V5(011).

As shown in FIG. 18, when the output voltage vector of the inverter 2 is the real vector V5(011), the V-phase current iv flows from the positive voltage side of the DC power supply 1 to the motor 9 via the V-phase upper-arm switching element 3b, the W-phase current iw flows to the motor 9 via the W-phase upper-arm switching element 3c, and the U-phase current iu flows from the motor 9 to the negative voltage side of the DC power supply 1 via the U-phase lower-arm switching element 3d, the U-phase lower-arm shunt resistor 6a, and the power-supply shunt resistor 5. At this point, the U-phase lower-arm voltage Vu, the V-phase lower-arm voltage Vv, and the W-phase lower-arm voltage Vw can be represented by the following Formula (42), (43), and (44).

$$Vu = iu \times Rdc + iu \times Rsh \quad (42)$$

$$Vv = iu \times Rdc \quad (43)$$

$$Vw = iu \times Rdc \quad (44)$$

When the motor 9 is the three-phase balanced load, according to the equilibrium condition of phase currents, $$iv + iw = iu \quad (45)$$

$$iv = iw = (\tfrac{1}{2})iu \quad (46)$$

That is, when the motor 9 is the three-phase balanced load, the phase currents iu, iv, and iw can be calculated using any one of the above Formulas (42), (43), and (44) and Formula (46).

Figure 19:
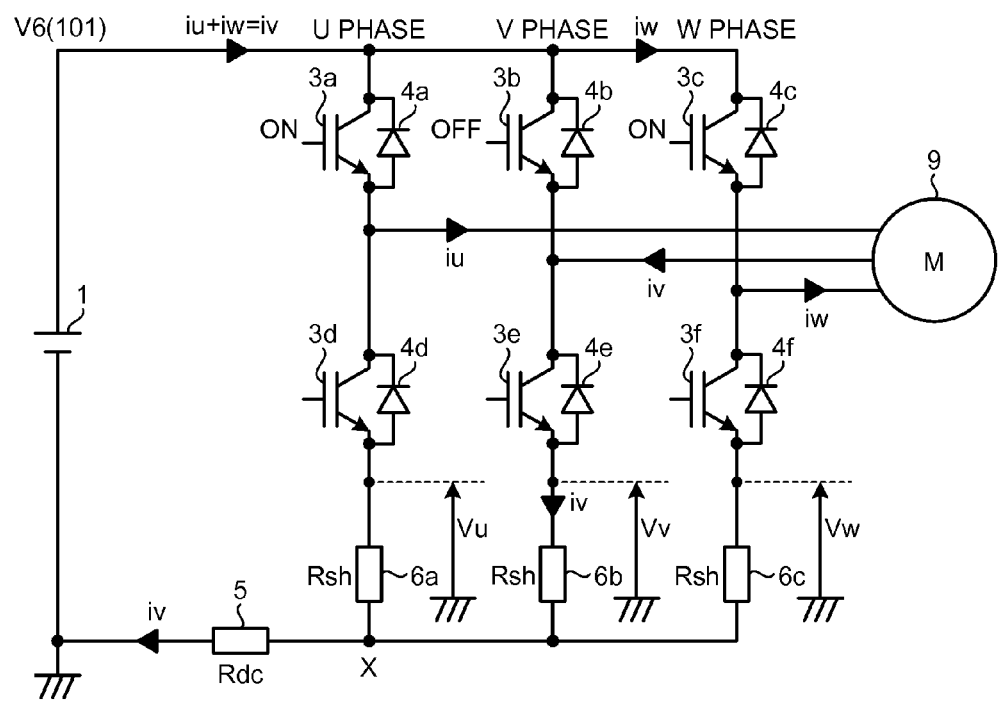
FIG. 19 is a diagram showing electric currents flowing to the units of the inverter when the output voltage vector of the inverter is the real vector V6(101).

FIG. 19 is a diagram showing electric currents flowing to the units of the inverter when the output voltage vector of the inverter is the real vector V6(101).

As shown in FIG. 19, when the output voltage vector of the inverter 2 is the real vector V6(101), the U-phase current iu flows from the positive voltage side of the DC power supply 1 to the motor 9 via the U-phase upper-arm switching element 3a, the W-phase current iw flows to the motor 9 via the W-phase upper-arm switching element 3c, and the V-phase current iv flows from the motor 9 to the negative voltage side of the DC power supply 1 via the V-phase lower-arm switching element 3e, the V-phase lower-arm shunt resistor 6b, and the power-supply shunt resistor 5. At this point, the U-phase lower-arm voltage Vu, the V-phase lower-arm voltage Vv, and the W-phase lower-arm voltage Vw can be represented by the following Formulas (47), (48), and (49).

$$Vu = iv \times Rdc \quad (47)$$

$$Vv = iv \times Rdc + iv \times Rsh \quad (48)$$

$$Vw = iv \times Rdc \quad (49)$$

When the motor 9 is the three-phase balanced load, according to the equilibrium condition of phase currents, $$iu + iw = iv \quad (50)$$

$$iu = iw = (\tfrac{1}{2})iv \quad (51)$$

That is, when the motor 9 is the three-phase balanced load, the phase currents iu, iv, and iw can be calculated using any one of the above Formulas (47), (48), and (49) and Formula (51).

As explained above, when the output voltage vector of the inverter 2 is the real vector V4(110), V5(011), and V6(101) as well, when the motor 9 is the three-phase balanced load, the phase currents iu, iv, and iw flowing to the phase winding wires of the motor 9 can be calculated by detecting any one of the U-phase lower-arm voltage Vu, the V-phase lower-arm voltage Vv, and the W-phase lower-arm voltage Vw.

As explained above, in the power conversion device in the second embodiment, as opposed to the configuration in the first embodiment, the phase lower-arms are provided for three phases. The power conversion device detects the three phase lower-arm voltages, which are the voltages between the connection points of the phase lower-arm switching elements and the phase lower-arm shunt resistors and the negative voltage side of the DC power supply, and calculates, on the basis of the detection values of the phase lower-arm voltages, the phase currents flowing to the load device. Therefore, although the number of the voltage detection units configured by the amplifying means is three, it is possible to attain a further reduction in the size and a further reduction in the costs of the device than the conventional configuration in which the phase lower-arm shunt resistors for three phases and the power-supply shunt resistor are provided in the same manner.

As in the first embodiment, not only when the output voltage vector of the inverter is the zero vector V0 but also when the output voltage vector of the inverter is the real vectors V1 to V6, the phase currents can be calculated. Therefore, it is possible to attain improvement of accuracy of the control based on the phase currents.

Further, when the output voltage vector of the inverter is the zero vector V0 and the real vectors V1 to V3, the phase currents can be obtained without using the first law of Kirchhoff and the equilibrium condition of phase currents. Therefore, the power conversion device can also be applied even when the load device is an unbalanced load.

Note that, in the embodiment explained above, the example is explained in which the phase currents are calculated according to the ON/OFF states of the phase upper-arm switching elements, that is, the output voltage vectors of the inverter irrespective of an operation state of the inverter. However, for example, a detection period of the phase lower-arm voltages used for the calculation of the phase currents can be switched according to an operation state of the inverter corresponding to a control application of the motor, which is the load device.

For example, in an application for performing operation for a long time in an operation state in which a modulation rate of the inverter is low in a low-speed operation region where relative-low-speed operation is performed, a generation period of the zero vector V0(000) is long and a generation period of the real vectors V1(100) to V6(101) is short. Conversely, in an application for performing operation for a longtime in an operation state in which the modulation rate of the inverter is high in a normal operation region where relatively-high-speed operation is performed, the generation period of the real vectors V1(100) to V6(101) is long and the generation period of the zero vector V0(000) is short.

Therefore, in the application for performing the operation for a long time in the operation state in which the modulation rate of the inverter is low, the phase currents are computed on the basis of the phase lower-arm voltages in the generation period of the zero vector V0(000). In the application for performing the operation for a long time in the operation state in which the modulation rate of the inverter is high, the phase currents are computed on the basis of the phase lower-arm voltages in the generation period of the real vectors V1(100) to V6(101). Consequently, detection accuracy of the phase lower-arm voltages is improved. It is possible to attain improvement of accuracy of the phase currents according to the improvement of the detection accuracy of the phase lower-arm voltages.

As a method of realizing such control, for example, a threshold for the modulation rate of the inverter is set in advance and detection periods of the phase lower-arm voltages used for the calculation of the phase currents only have to be switched according to a magnitude relation between the modulation rate of the inverter and the threshold.

More specifically, it is conceivable to adopt a method of computing, when the modulation rate of the inverter is smaller than the threshold, the phase currents on the basis of the phase lower-arm voltages in the generation period of the zero vector V0(000) and computing, when the modulation rate of the inverter is equal to or larger than the threshold, the phase currents on the basis of the phase lower-arm voltages in the generation period of the real vectors V1(100) to V6(101).

In this case, for example, it is desirable to set the threshold for the modulation rate of the inverter to 0.5 at which the generation period of the zero vectors V0(000) and V7(111) is a half cycle of a carrier signal.

Consequently, when the modulation rate of the inverter is equal to or larger than 0.5, the generation period of the zero vectors V0(000) and V7(111) is equal to or smaller than the half cycle of the carrier signal. Therefore, it is possible to compute the phase currents on the basis of the phase lower-arm voltages in the generation period of the real vectors V1(100) to V6(101) in which more accurate computation of the phase currents is possible. When the modulation rate of the inverter is smaller than 0.5, the generation period of the zero vectors V0(000) and V7(111) is longer than the half cycle of the carrier signal. It is possible to compute the phase currents on the basis of the phase lower-arm voltages in the generation period of the zero vector V0(000) in which more highly accurate computation of the phase currents is possible.

As a method of switching, according to the modulation rate of the inverter, the detection periods of the phase lower-arm voltages used for the calculation of the phase currents, it is also conceivable to adopt a method of tabulating modulation rates of the inverter and the detection periods in advance in association with each other, referring to this table during the operation of the inverter, selecting a detection period corresponding to a modulation rate of the inverter, and computing the phase currents on the basis of the phase lower arm voltages in the detection period.

Note that, by applying the power conversion device explained in the embodiments above to a motor driving device that drives a motor as a load and applying the motor driving device to a blower and a compressor of an air conditioner, a refrigerator, a freezer, and the like, it is possible to attain a reduction in the sizes, a reduction in the costs, and improvement of accuracy of control of the motor driving device, the blower, the compressor, the air conditioner, the refrigerator, and the freezer.

It goes without saying that the configuration explained in the embodiments above is an example of the configuration of the present invention and can be combined with other publicly-known technologies and can be changed by, for example, omitting a part of the configuration in a range not departing from the spirit of the present invention.

INDUSTRIAL APPLICABILITY

As explained above, the power conversion device, the motor driving device including the power conversion device, the blower and the compressor including the motor driving device, and the air conditioner, the refrigerator, and the freezer including the blower and the compressor are useful for a configuration including a three-phase inverter of a PWM modulation system and are, in particular, suitable as a technology capable of extending a detection period of the phase currents and attaining improvement of accuracy of control based on the phase currents without causing an increase in the size and an increase in the costs of the device.

The invention claimed is:

1. A power conversion device that converts DC power supplied from a DC power supply into three-phase AC power, the power conversion device comprising:
    an inverter that is configured by connecting arms for three phases in parallel, each of the arms including an upper-arm switching element and a lower-arm switching element;
    a power-supply shunt resistor provided between a negative voltage side of the DC power supply and the inverter;
    phase lower-arm shunt resistors respectively provided between the phase lower-arm switching elements for at least two phases among the three phases and the power-supply shunt resistor;
    voltage detection units to detect voltages between connection points of the phase lower-arm switching elements and the phase lower-arm shunt resistors and the negative voltage side of the DC power supply; and
    a control unit to input detection values of the voltage detection units and generate six drive signals corresponding to the phase upper-arm switching elements and the phase lower-arm switching elements.

2. The power conversion device according to claim 1, wherein the control unit calculates phase currents flowing to the load device on the basis of the detection values of the voltage detection units and generates the drive signals on the basis of the phase currents.

3. The power conversion device according to claim 2, wherein the control unit switches, according to an operation state of the inverter, a detection period for detection values of the voltage detection units used for the calculation of the phase currents.

4. The power conversion device according to claim 3, wherein the operation state is a modulation rate of the inverter.

5. The power conversion device according to claim 4, wherein the control unit sets, when the modulation rate is smaller than a threshold set in advance, as the detection period, a period in which all of the phase upper-arm switching elements are in an OFF state and sets, when the modulation rate is equal to or larger than the threshold, as the detection period, a period in which one or two of the phase upper-arm switching elements are in an ON state.

6. The power conversion device according to claim 4, wherein the control unit selects the detection period corresponding to the modulation rate on the basis of a table in which the modulation rate and the detection period are associated.

7. The power conversion device according to claim 1, wherein the phase lower-arm shunt resistors and the voltage detection units are provided for two phases among the three phases.

8. The power conversion device according to claim 7, wherein the control unit switches, according to an operation state of the inverter, a detection period for detection values of the voltage detection units used for the calculation of the phase currents.

9. The power conversion device according to claim 8, wherein the operation state is a modulation rate of the inverter.

10. The power conversion device according to claim 9, wherein the control unit sets, when the modulation rate is smaller than a threshold set in advance, as the detection period, a period in which all of the phase upper-arm switching elements are in an OFF state and sets, when the modulation rate is equal to or larger than the threshold, as the detection period, a period in which one or two of the phase upper-arm switching elements are in an ON state.

11. The power conversion device according to claim 9, wherein the control unit selects the detection period corresponding to the modulation rate on the basis of a table in which the modulation rate and the detection period are associated.

12. The power conversion device according to claim 1, wherein the phase lower-arm shunt resistors and the voltage detection units are provided for the three phases.

13. The power conversion device according to claim 12, wherein the control unit switches, according to an operation state of the inverter, a detection period for detection values of the voltage detection units used for the calculation of the phase currents.

14. The power conversion device according to claim 13, wherein the operation state is a modulation rate of the inverter.

15. The power conversion device according to claim 14, wherein the control unit sets, when the modulation rate is smaller than a threshold set in advance, as the detection period, a period in which all of the phase upper-arm switching elements are in an OFF state and sets, when the modulation rate is equal to or larger than the threshold, as the detection period, a period in which one or two of the phase upper-arm switching elements are in an ON state.

16. The power conversion device according to claim 14, wherein the control unit selects the detection period corresponding to the modulation rate on the basis of a table in which the modulation rate and the detection period are associated.

17. A motor driving device comprising the power conversion device according to claim 1.

* * * * *